(12) United States Patent  
Liu

(10) Patent No.: US 8,334,004 B2  
(45) Date of Patent: Dec. 18, 2012

(54) INTELLECTUALIZED COOKING METHOD

(76) Inventor: Xiaoyong Liu, Shenzhen (CN)

( * ) Notice: Subject to any disclaimer, the term of this patent is extended or adjusted under 35 U.S.C. 154(b) by 664 days.

(21) Appl. No.: 11/719,811

(22) PCT Filed: Nov. 21, 2005

(86) PCT No.: PCT/CN2005/001970
§ 371 (c)(1),
(2), (4) Date: May 5, 2009

(87) PCT Pub. No.: WO2006/053507
PCT Pub. Date: May 26, 2006

(65) Prior Publication Data
US 2009/0297678 A1    Dec. 3, 2009

(30) Foreign Application Priority Data

Nov. 22, 2004    (CN) .......................... 2004 1 0052317

(51) Int. Cl.
*A23L 1/01*    (2006.01)
(52) U.S. Cl. ......... 426/233; 426/438; 426/519; 426/523
(58) Field of Classification Search .......... 426/231–233, 426/438, 523, 519
See application file for complete search history.

(56) References Cited

U.S. PATENT DOCUMENTS

| | | | | |
|---|---|---|---|---|
| 1,576,321 | A * | 3/1926 | Gasser | 99/407 |
| 2,186,345 | A * | 7/1940 | Reidenbach | 366/332 |
| 4,503,502 | A * | 3/1985 | Chapin | 700/90 |
| 4,561,346 | A * | 12/1985 | Marquer | 99/348 |
| 4,919,950 | A * | 4/1990 | Mak | 426/233 |
| 5,385,085 | A * | 1/1995 | Piane, Sr. | 99/422 |
| 6,112,645 | A * | 9/2000 | Chang | 99/327 |
| 6,515,262 | B1 * | 2/2003 | Li | 219/429 |
| 6,647,864 | B1 * | 11/2003 | Fang | 99/327 |
| 7,174,830 | B1 * | 2/2007 | Dong | 99/334 |
| 2004/0159244 | A1 * | 8/2004 | Leason | 99/348 |
| 2005/0011370 | A1 * | 1/2005 | Xu et al. | 99/409 |
| 2005/0223906 | A1 * | 10/2005 | Xu et al. | 99/348 |
| 2008/0110347 | A1 * | 5/2008 | Wong | 99/348 |

OTHER PUBLICATIONS

Professional Cooking, 3rd Edition, Wayne Gisslen, John Wiley & Sons Inc., 1995, p. 618-621.*

* cited by examiner

*Primary Examiner* — Drew E Becker
(74) *Attorney, Agent, or Firm* — Kening Li; Pinsent Masons LLP

(57) ABSTRACT

The present invention involves an intelligent cooking method, especially a cooking method defined as oil stir-fry in Chinese cuisine. The present cooking method is comprised of the following steps: feeding heat transfer medium, feeding cooking materials, dispersing and/or turning-over cooking materials, separating cooking materials from oil, re-feeding cooking materials, stir-frying and/or turning-over cooking materials, etc. The method can perform intelligent cooking and can accurately control the duration and degree of heating to achieve the effect of stir-fry which is one of main cuisine techniques.

9 Claims, 12 Drawing Sheets

INTELLECTUALIZED COOKING METHOD

CROSS REFERENCES TO RELATED APPLICATIONS

This application claims priority to People's Republic of China Patent Application No. 200410052317.6, filed on Nov. 22, 2004, the entire disclosure of which is incorporated herein by reference.

FIELD OF THE INVENTION

This invention relates to a cooking method. Specifically, this invention relates to an intelligent oil stir-fry cooking method on an automatic or semiautomatic cooking machine through programmable control of material-feeding, stirring, and the duration and degree of heating.

BACKGROUND OF THE INVENTION

The basic technique of Chinese cooking consists of stir-fry, quick-fry, shallow-fry, deep-fry, roasting, simmering, braising, quick-boil, boiling, steaming and slippery-fry etc. Among them the stir-fry employs oil and metal as main medium for heat transferring, in which the amount of oil is relatively small, the temperature of oil during cooking is relatively low, and there usually is a step for quickly seasoning after raw material being well cooked.

According to the heating feature the above stir-fry can be divided into oil stir-fry and lasting stir-fry. The oil stir-fry is most widely used and includes two basic steps: oil-frying and stir-frying. Cooking materials are fried well in oil in the step of oil-frying. In this step the key factor is to control the change of oil temperature when cooking materials being put into a pot with considering the amount of cooking materials, the amount of oil, the intensity of heating, and the requirements of cooking material for the temperature of oil. The cooking materials should be quickly stirred and dispersed after being put in order to prevent the cooking materials from shedding of starch or egg-white or from massing. Then the dispersed cooking materials should be taken out immediately and make oil leached. In the step of stir-frying, the cooking materials are quickly heated in a medium or high heating intensity with moderate or little oil (which may include water, soup and water starch etc) or metal itself (such as that of a pot or a cooking container) as medium for heat transferring, and simultaneously the cooking materials are quickly stirred, turned over, and mixed with a stirring tool and/or through the relative movement between the cooking materials and the pot to ensure the taste, color and effect of the finished dish (such as delicious, tender, crisp, smooth, tasty, and/or mellow). During the stir-frying, which is the last step of oil stir-fry, the oil-fried materials and seasonings should be mixed. The more quickly the stir-frying is done, the more tender the finished dish will become. It is important to ensure the strong fire, quick action and accurate seasoning. For many dishes prepared by oil stir-fry it is necessary to fry shallot, ginger, garlic or other seasonings in dry manner before the step of stir-frying. There are three methods for putting starch on cooking materials in oil stir-fry, including mixed pouring, successive pouring, and pre-pouring. The first one is to put all necessary seasonings and starch in a small bowl, mix them completely, and then pour the obtained mixture onto the oil-fried materials or into a pot when cooking materials have been cooked with subsequent quick stirring. The second one is to put seasonings and soup in turn into a pot after the oil-fried materials being put, and then pour water starch after boiling. The third one is to put all necessary seasonings and soup into a pot and then put the oil-fried materials into it after it is boiled. It is necessary to accurately control on the oil's temperature, the heating intensity, the time of material-feeding and the stirring frequency for preparing dishes with wonderful color, odor and taste.

New kitchen devices have been developed in recent years, such as automatic electric rice cooker, etc. However these kinds of kitchen devices are only used for solving certain problems. They almost can do nothing for performing cuisine, especially the Chinese cuisine, such as performing various cuisine techniques, especially those of stir-fry, the control on duration and degree of heating, various basic operations of cuisine, etc.

The fundamental problems of automatic cooking are to replace various manual actions with automatic or semiautomatic mechanical actions, adopt artificial intelligence method on automatic or semiautomatic devices, and perform various basic cuisine techniques automatically or semi-automatically, such as stir-fry, quick-fry, shallow-fry, deep-fry, roasting, simmering, braising, quick-boil, boiling, steaming and slippery-fry, etc.

Some cooking devices sold in the market, such as micro-wave oven, are said to be configured with tens of cuisine programs with the capability of making major styles of cooking. Actually the micro-wave oven is not fit for Chinese cuisine, even for western cuisine, and such kind of cooking devices could not implement many basic cooking actions such as auto-feeding, automatic stirring, etc. For the control of duration and degree of heating alone, different controls on duration and degree of heating are required in different styles of dishes, different material selections and different preparation methods. Therefore only tens of programs that programmed according to styles of cooking or categories cannot cover all of these requirements for duration and degree of heating. Take "shredded pork with garlic sauce" for instance. Different material selections (such as loins and meet of leg), different preparation styles (horizontal cutting and vertical cutting, small parts and big parts etc) and different amount of materials will require different control on duration and degree of heating and operations. Thus the same cooking procedure cannot achieve the same cuisine effects under different conditions.

A fully automatic cooking device is published in Chinese patent 01230251.1, which discloses how to separate materials from oil using oil-material separator. This oil-material separator contains empty an oil box 45 and a cover 44 consisting of net/oil pump on the top of the empty oil box 45. The cover 44 is opened while separating oil from materials, the pot 47 is moved to the top of the empty oil box 45 and rotated until it touches the inner net of cover 44. The cooking materials are stopped by the net and the oil pours into the empty oil box 45. Although this oil-material separator can remove oil the cooking materials are kept in the pot. Therefore the oil on the cooking materials is difficult to leach thoroughly, which may cause starch can not be covered on cooking materials in the subsequent stir-frying and seasoning. If the oil is forced to be filtrated completely it is difficult to avoid the cooking materials being moved to cover 44 along with oil. If this happens, the device published in this patent cannot return these materials to the pot. Even when the oil is filtrated completely and all cooking materials are kept in the pot, there still exists some vital problems for cuisine. As we know, the step of oil-frying is undertaken in the warm oil while the step of stir-frying should be performed under high heating intensity. Usually there exists a procedure of heating the pot with strong fire after oil-frying, and if the cooking materials are left in the pot 47 at this time, then they will be overcooked, losing the wonderful taste of oil stir-fry. The shallot, ginger and garlic (fry very quickly over hot fire) or other seasonings are quickly fried before stir-frying for many dishes of oil stir-fry, and if the cooking materials are left in the pot 47 this kind of procedure are almost impossible to be conducted. In addition, no mechanism which can give rapid and effective material dispersing is equipped with this device. In addition the dispersing function is still impossible in it. Therefore, it is obvious that the technique of oil stir-fry cannot be realized by the device disclosed in this patent.

Chinese patent 98232654.8 opens an automatic cooking device of Chinese dishes with the function of automatically turning a pot's bottom over, which can be used to pour cooking materials out of the pot automatically. But the device disclosed in this patent cannot be used to perform oil stir-fry because no dispersing mechanism, oil leaching mechanism or re-feeding mechanism is equipped with it.

SUMMARY OF THE INVENTION

The purpose of this invention is to provide an intelligent oil stir-fry cooking method, which can be realized in an automatic or semiautomatic cooking device and can automatically or semi-automatically control the duration and degree of heating and its relevant actions, such as material-feeding, dispersing, turning over, taking out, oil leaching, re-feeding, etc, according to different styles of dish, different material selections and different preparation methods, the amount of cooking materials, the environment of the cooking device, etc.

The above purpose of this invention can be reached through an intelligent oil stir-fry cooking method which can be realized in a cooking device which is comprised of cooking containers, a control system and a heating system. The above cooking method includes the following steps:

(1) starting the cooking device;
(2) feeding heat transfer medium, such as oil, into one of the cooking containers and heating the heat transfer medium by the heating system of the cooking device according to the instruction from the control system of the cooking device;
(3) feeding cooking materials into the heat transfer medium in the cooking container according to the instruction from the control system;
(4) dispersing and/or turning-over the cooking materials in the cooking container;
(5) separating the cooking materials from the heat transfer medium;
(6) re-feeding the cooking materials which are separated from the heat transfer medium into one of the cooking containers;
(7) stir-frying and/or turning-over the cooking materials in the cooking container of step (6).

In the method mentioned above, it can further include the step of inputting data, inputting instruction, and/or loading, inputting and executing a software, such as cooking program, after the step (1) and before or after feeding the heat transfer medium. More specifically, the inputting or loading can be done by utilizing the information on a cooking material package.

For instance, the inputting of the relevant information for cooking materials, the relevant information or instructions for cooking procedure, and programs can be implemented by reading, for example scanning, the information on the cooking material package. It can also be done by an input device, such as a communication device, network, keyboard (buttons), dialogue interface, voice/sound/light input device, etc. In addition, it can also be done by reading from memory medium, and/or by sensors or monitoring means in the cooking device.

The above-mentioned relevant information for cooking materials, which can include material codes and data, can be the identification information of dishes/materials, the information about the category of cooking materials, their preparation characteristic and time, their preservation time, their weights, etc, and/or the information about the state of cooking materials, such as their temperature measured by a sensor installed on a material-feeding mechanism, which can lead to different cooking actions and different control on duration and degree of heating.

The above-mentioned relevant information for cooking procedure can be process requirements, process parameter, process time, working environment, working condition, operation state of the cooking device, the duration and degree of heating, instructions for acting, etc. The user may input relevant data according to his own taste, preference, cooking requirements, etc, in this step.

The above information can be notification information, for instance, information input by an operator to tell the cooking device that some actions, for example feeding actions, have been done, especially those actions done manually. The above information can also be the confirming information or feedback information, for example the confirming information sent by an operator after receiving the information of the cooking device or the information from its prompt means for cooking, or the feedback information sent by him after performing some actions according to the instructions of the cooking device. The above information can also be the relevant information provided by an operator according to the instructions or demands of the cooking device or its prompt means, for example the initial setting information of the cooking device or its prompt means, the information about working environment, working condition, operation state of the cooking device, etc. The above-mentioned programs can be a cooking program, a prompt or direction program, the acting program of the control system of the cooking device or its prompt means, etc.

In the method of the present invention, the heat transfer medium can be added manually in the method of the present invention. Preferably, it is fed or added through a liquid adding mechanism in the cooking device, or it is packaged in a package and added into the cooking container through this package.

In the method of the present invention, the cooking material(s) can also be added manually in the method of the present invention. Preferably, it is packaged in a cooking material package which can be opened by a material feeding mechanism in the cooking device, and fed or added into one of the cooking containers. Another solution is that the cooking material(s) is placed in a container and then added into one of the cooking containers from this container with a material feeding mechanism in the cooking device.

In the method of the present invention, the dispersing and/or turning-over in step (4) and the stir-frying and/or turning-over in step (7) can be implemented manually, but preferably implemented with a dispersing/turning-over mechanism in the cooking device. The dispersing/turning-over mechanism can be a dispersing mechanism (such as a stirring mechanism), a stir-frying mechanism, an automatic spatula (scoop) and/or a motion mechanism of cooking container. The experiments conducted by the inventor showed that the motion mechanism of cooking container alone can have the full functions of dispersing, stir-frying or turning-over. Of course these functions can also be achieved by the combination of a motion mechanism of cooking container with other dispersing/turning-over mechanism.

Preferably, the cooking materials are separated from the heat transfer medium through a separating mechanism of the cooking device, for example an oil leaching mechanism, which can be installed within, outside or near the main body of the cooking device.

In addition, the present cooking method can further include a step to control or adjust the heating intensity of the heating system automatically or semi-automatically. The control or adjustment of the heating intensity or the heating power can be automatically or semi-automatically conducted by a heating adjustment mechanism in the cooking device according to the commands from the control system based on time, the information or instruction input by an operator or obtained by the cooking device from the outside, data from sensing/monitoring means, and/or data stored in the memory system of the cooking device. For example, the data of duration and degree of heating are measured and fed back in real-time to the control system, and then compared with relevant setting value. The adjustment of heating intensity can also be implemented manually under the prompt or assistance from the control system or prompt means of the cooking device.

For the cooking method of oil stir-fry the cooking materials added into the heat transfer medium in step (3) are main material which is generally flesh material or other main material, such as bean curd. And in step (6) one or more of other materials can be added in one time or in several times before or after adding the main material. If the main material is flesh material, this kind of main material is expected to be firstly covered with starch or egg white, etc. And when the main material is re-fed into one of the cooking containers in step (6) other material such as seasonings, starch material, their mixture, etc can be added too.

The cooking materials may be classified as main material, auxiliary material, seasoning, starch material, etc. The main material is generally flesh material, such as pieces of meet. The auxiliary material is generally plant material, such as vegetable. The starch material can be starch alone, the mixture of starch with egg white, with or without water or soup. The main material is generally processed to be covered with starch material. According to the present method the cooking materials for oil stir-fry can be main material alone or main material together with one or more selected from the group consisting of auxiliary material, seasoning and starch material. But different steps can be employed for different cooking materials. Furthermore, whether the main material, auxiliary material, seasoning or starch material can be more than one kind in the final cooking materials.

The heat transfer medium in the present invention can be water, oil, gas, salt, etc, and oil or water is preferable. For oil stir-fry the preferable heat transfer medium is oil. The weight and adding time of the heat transfer medium can be determined according to the data set by a program, the information or instruction input from outside of the cooking device, the data stored in the memory medium, and/or the data obtained from a sensing means, etc. The material-feeding mechanism in the cooking device can be controlled by the control system automatically/semi-automatically or controlled by an operator according to the instruction from the control system or a prompt means in the cooking device manually. Moreover, the cooking material can fed and then heated, or can be preheated, fed and heated again.

The following will explain the present invention in more details.

In the present invention the cooking program will contain the basic action commands based on cooking techniques and practical experiences of cookers for a cooking method, for example for oil stir-fry, as well as action commands for automatic or semiautomatic control of duration and degree of heating according to different styles of dish, different material selections and different preparation methods, the amount of cooking materials, the environment of the cooking device, etc. The cooking program can also contain action commands to deal with the feedback information for the heat transfer medium, the duration and degree of heating, the working environment, the working condition, the operation state of the cooking device, etc and adjust the heating intensity, for instance, to turn up gas flow, to prolong the heating time, or to reduce the frequency of stir-frying/turning-over when the gas pressure is comparatively low or the temperature of environment is comparatively low. A cooking program and a cooking prompt program can be independent from each other, or they can be integrated together or related with each other in some manner. For instance, some commands in the cooking program can be used to load a cooking prompt program.

When the cooking containers are heated the control system will control and adjust the factors related to the data set by a program, the information or instruction input from outside of the cooking device, the data stored in the memory medium, and/or the data obtained from a sensing means, etc and thus control the time of heating, the heating power and the heating intensity. For instance, the above control can be realized by adjusting the power of the heating system, or the flow rate or pressure of gas. The heating system can be a gas heating system, an electrical heating system, an electromagnetic heating system, a micro-wave heating system, a light-wave heating system, an infrared heating system, and/or other heating system. The automatic adjustment mechanism used for controlling the heating intensity can be a driving means which can make successive or graded adjustment, and/or an electrical/electromagnetic adjustment mechanism.

The control of cooking duration (i.e. the duration and degree of heating) is one of the key factors determining a cooking process and the final result. The so called control of cooking duration can be divided into the control of the "fire" or "heating" and the control of the "time". The former is a control of the heating intensity, and the latter the control of the time. In the cooking method mentioned above, the control of the "fire" can be carried out by the automatic control of the heat intensity, based on the correct measurement and feedback of the cooking duration and the initial state for the selected heat transfer medium and cooking-material as mentioned above in real-time, and/or the adjustment of the heating power/combustion intensity. The control of the "time" can be carried out through controlling automatically the time of each cooking action by the control system in an automatic or a semi-automatic cooking machine according to the cooking program, the measured data about the initial state and/or cooking duration by sensor(s), and/or preset time.

The time of material-feeding and the weight of cooking materials can be determined by the control system of the cooking device through executing the cooking program based on the working environment, the working condition, the operation state of the cooking device, the heat transfer medium, the initial state of cooking materials and/or the duration and degree of heating, the information or instruction input from outside of the cooking device, the data stored in the memory medium, and/or the data preset by the cooking program, such as time. The instruction from the control system of the cooking device can directly or indirectly start or control the material-feeding mechanism of the cooking device, and add cooking materials, which can be in the cooking material package or in the material-feeding mechanism, into a cooking container. Or the control system sends instructions to a prompt means to prompt an operator. The material-feeding can be done in one time or in several times. For instance, material A is added firstly, then material B, and when material B is cooked to certain extent material C is added.

The materials, the heat transfer medium can be packed in package or placed in the container, identifying information can be printed on the package, such as bar code that provides the code/style of dishes etc obtained by control system through scanning device etc with the purpose of requesting/operating relevant cooking program. The materials in the package/container can be only materials of oil stir-fry, namely flesh materials, also include other materials or the heat transfer medium, also include two kinds or more of materials or the heat transfer medium, there can be one kind or more of every material or the heat transfer medium. Generally speaking, the materials of oil stir-fry have been covered with water starch or egg white etc before adding, namely have been handled with starch.

Apart from the cooking material package can be used for adding materials and the heat transfer medium, other adding devices are useful. For instance, add solid and liquid materials and the heat transfer medium quantitatively adopting adding device, such as material-feeding box with active door or can be overturned, liquid pump system etc; Take another instance, add water, oil and soup etc with certain temperature required in cooking quantitatively through the reserving device and on-off adding device of water, oil and soup etc. The adding can be implemented automatically under the control of control system of cooking device, also can be controlled manually with the instruction and assistance of control system of cooking device or instructing device when adding depending on these adding devices. Adding certain materials in the pot and/or container of cooking device manually is an auxiliary adding manner for materials adding by package of materials and other adding device. For instance, manual adding is fit for materials with great volume cannot be put into package of materials. Take fresh egg for another instance, it can be added after its shell is removed manually. The operator can implement the auxiliary adding by himself, or the adding can be implemented under the instruction and assistance of control system of cooking device.

On this invention, the dispersing tool, turnover tool, and activating the cooking container, or the combination of these manners are adopted, which can make rapid dispersing and/or stirring of materials for their sufficient touching with the heat transfer medium and preventing shedding and massing of water starch or egg white etc, meanwhile rapid heating and cooking are ensured.

In this invention, the materials are separated from the heat transfer medium in the manner of using tools or overturning pot etc, for instance, leaching tool (a kind of solid-liquid separating mechanism) is used for taking materials out of oil and making leaching, also the tools of fishing, nipping, grasping, shoving, scratching, lifting, and/or drawing can be used for moving the materials into oil leaching mechanism, or move the materials into oil leaching mechanism through overturning the pot with the aim of pouring out the oil in pot and achieving complete leaching for further operation. Separating the materials from the heat transfer medium can be the separation between materials and other the heat transfer medium, such as metal pot, soup, water etc. This step is a key in cooking method of oil stir-fry, leaching is vital for the excellent taste of oil stir-fry. The fishing or overturning and leaching can be implemented through overturning system, fishing system, materials getting out of pot system, leaching system etc under the instruction from the control system of automatic or semiautomatic cooking device.

The main materials can be re-added in the original cooking container or other cooking containers, such as pot of other cooking sub-system, and the same for the adding of other cooking materials (such as auxiliary materials etc). Different sections of technique can be undertaken simultaneously in different cooking containers or sub-systems when cooking device operates this way, take the oil-frying in oil-frying device for instance, after taking the materials out of pot and making leaching, move them into stir-frying mechanism for stir-frying, special device with great volume and high efficiency also is selective for the great improvement of efficiency. The said materials or other materials can be transmitted to other cooking containers or other cooking sub-systems depending on material transmitting device/adding device for adding, also partly or completely by people with the instruction/assistance of control system or instructing device.

It is worthy of notice that leaching and material returning in said step only make sense for main materials of oil stir-fry, and it is unnecessary for auxiliary materials of oil stir-fry; The heat transfer medium used for oil-frying of main materials should be removed from pot sometimes, new the heat transfer medium can be added in handling of materials returning. When main materials and auxiliary materials are exists in the process of oil stir-fry, auxiliary materials adding is implemented after leaching. In the process of material returning, auxiliary materials cooking can go faster than cooking of main materials after leaching, and the reversal of these two processes is adoptable. Moreover, seasonings and thickened soup can be added in material returning.

The control system of cooking device defines moment of operating and operating manner through making data processing on data of relevant programs, such as time, the input/obtained information/instruction, data from sensing/monitoring means, and/or data in memory system, such as reading, identifying, comparing, retrieval, decoding, addressing, arithmetic operation, logic operation/testing etc, and sends instruction for direct or indirect control on operating of sub-systems in cooking device. The instruction from control system is also the order for instructing device or auxiliary device with the purpose of making operator control relevant device/device/sub-system under the instruction or assistance of these devices.

In fact, one or more of the overturning, materials getting out of pot, leaching, material moving, material parting, and/or re-feeding can be implemented with manual assistance in this method. The operator can do this by himself, or with the instruction or assistance of control system or instructing system of cooking device.

The state of operating of various movement parts in automatic or semiautomatic cooking device can be measured in above-mentioned method, such as the position of material-feeding mechanism; And the control system controls driving device and/or transmission device and/or other movement devices automatically according to measured physical quantity of state of movement and/or its varying quantity. The measurement of state of movement can be achieved by one or more sensors used for measuring parameter of state of movement, also by other measuring devices, such as measuring device owned by electrical machine.

The step of cooling is selective in said method in order to achieve the direct or indirect cooling for pot and/or materials rapidly, consequently the temperature, duration and degree of heating can be controlled accurately. For instance, air-cooling (blasting) and/or water-cooling (coil) and/or injecting water into pot are adoptable for cooling.

The step of washing is selective in said method, including flushing by water and/or brushing.

The materials can be cooked well once, also in stages in said method.

Various steps can be implemented simultaneously, or interactively, or repeatedly in said method, a step can be implemented once or more, no immovable sequence for various steps, simultaneous or interactive implementation can occur.

The cooking device is automatic/semiautomatic in this invention, such as automatic/semiautomatic cooking device, or system of cooking device consists of two or more subsystems, such as the system of cooking device consists of automatic/semiautomatic cooking device, stir-fry/stirring device, other cooking devices with the part or complete functions of cooking (such as oil-frying device, micro-wave oven, steaming/boiling device, deep-fry device, shallow-fry device, oven, pressure cooker, electric rice cooker, assembly-line of cooking etc), peripheral/auxiliary device (such as material-feeding mechanism, overturning device, transmitting device, reserving device, getting out of pot or material returning device, re-feeding device, and dispersing tool, oil leaching mechanism, controller of heating intensity etc), sensing/monitoring means (such as inspecting/supervising sensor or device used for the measuring of working environment of devices, such as temperature of environment, working condition, such as gas flow, pressure and heat value, state of operating, such as operating of device and duration and degree of heating etc), control system, and/or cooking instructing device etc.

The cooking method in this invention can achieve the automatic and high-quality cooking from firing and material-feeding to completeness of cooking with automatic cooking device by comparison with current cooking method. This method is not only used for automatic cooking, but also achieve high-quality dishes with steady quality and other foods according to the rich experience of cook, setting cooking program according to data from experiment, and relevant parameters, including temperature and time etc about control on duration and degree of heating through the accurate and timely measuring of duration and degree of heating and control on heating intensity.

This method can be used with semiautomatic cooking device, or achieve semiautomatic cooking with automatic cooking device, some auxiliary operations are implemented manually, whereas the control system can choose the moment and manner of operation and send instructions to operator in order to achieve a better effect.

A further instruction to this invention is given below with the figures and concrete manners of implementation. It should be pointed out, however, although this method is especially fit for oil stir-fry, this method can be expanded into other cooking techniques if little change is made on the basis of this invention. Therefore, the following methods are not the limit to this invention.

DETAILED DESCRIPTION OF THE PREFERRED EMBODIMENT

Figure 1:
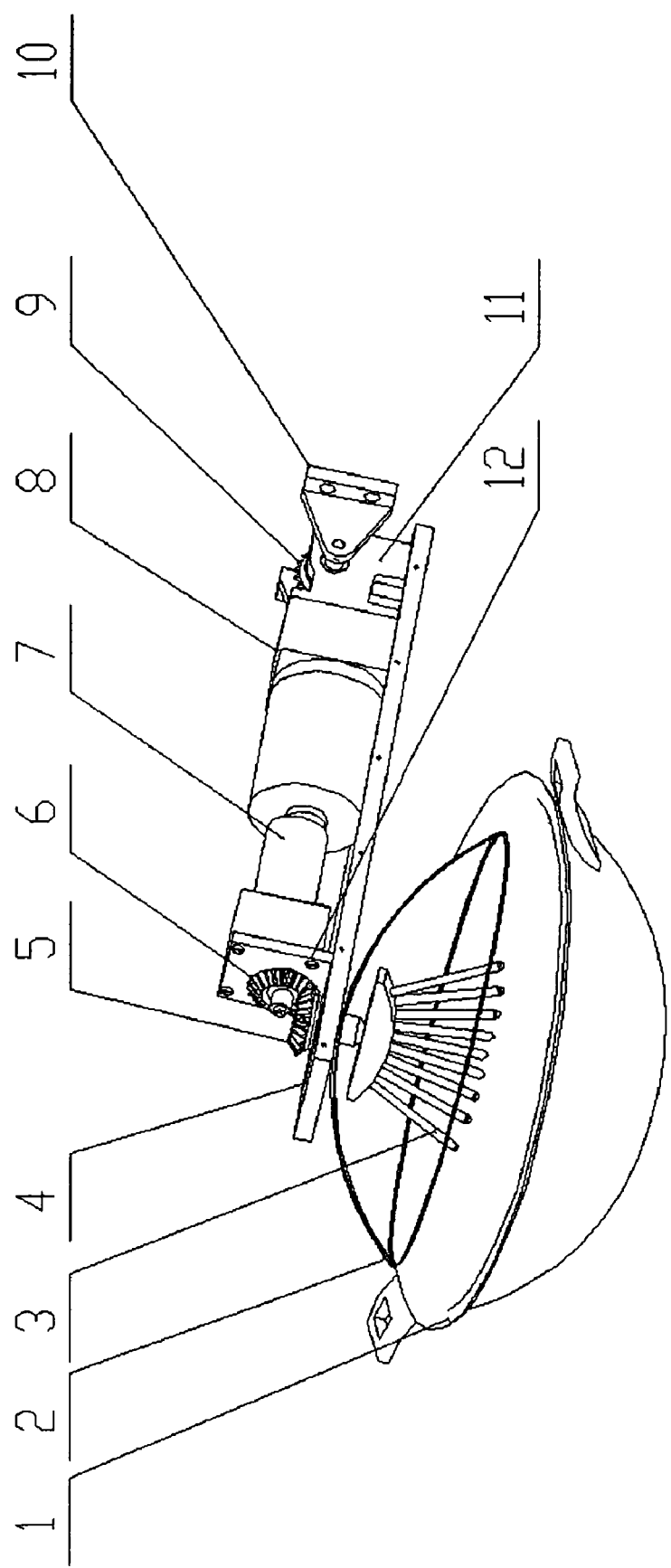
FIG. 1 is a schematic view of one dispersing mechanism which can be used in the cooking method of the present invention.

A dispersing mechanism that can achieve this cooking method is showed in FIG. 1, which contains pot, dispersing tool, limit cover and swing arm.

The rotating electrical machine 7 installed on the bracket of electrical machine 12 drives the rotating of comb-like dispersing tool 3 through bevel gear 5 and 6 installed on the baseboard of swing arm 4, the materials in pot 1 are dispersed rapidly. The limit cover 2 is on the pot 1 while dispersing in order to prevent the overflow and splashing of materials and the heat transfer medium. After dispersing, the rotating electrical machine 8 installed on the bracket of electrical machine 11 drives the rotating of swing arm about the axis on the overturning bracket 10, and lift the swing arm in order to make room for further operation.

Figure 2:
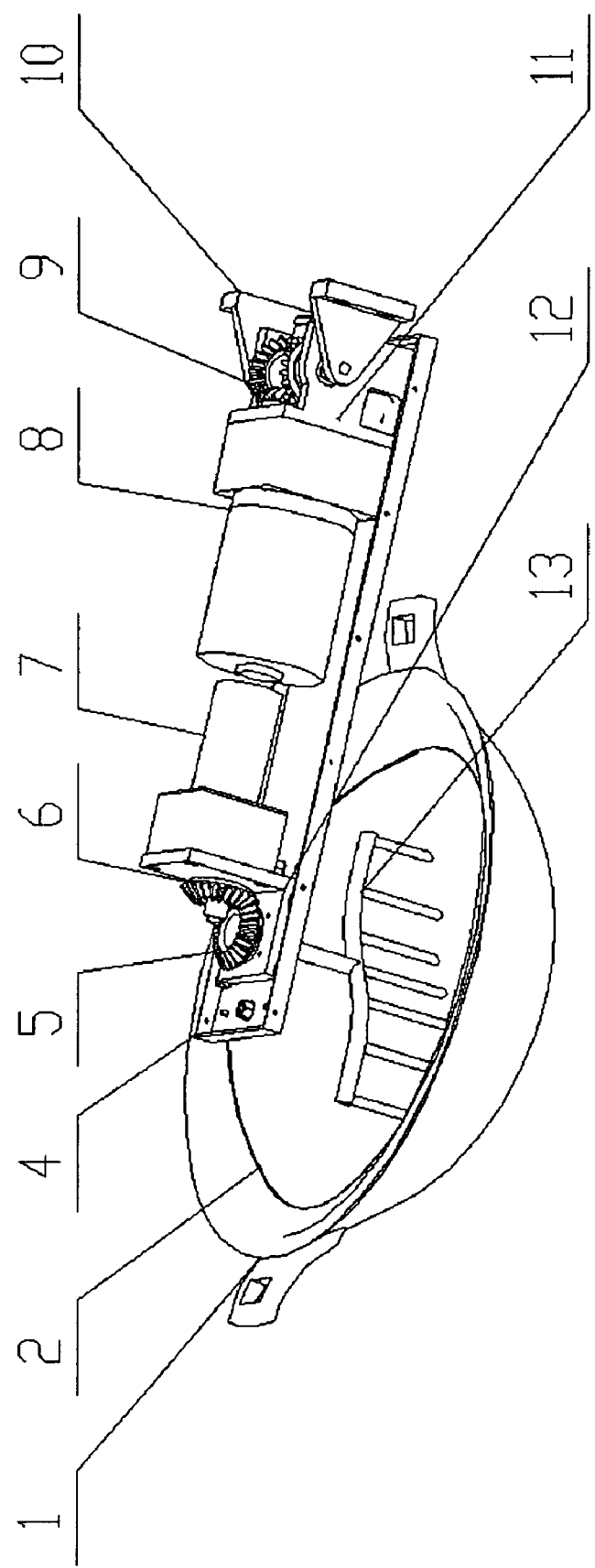
FIG. 2 is a schematic view of another dispersing mechanism which can be used in the cooking method of the present invention.

The device showed in FIG. 2 is a new dispersing mechanism achieving the method of the present invention, its structure and operation are similar to that of device in FIG. 1, just the shape of dispersing tool are changed into "S" with the expectation of better dispersing effect.

Figure 3:
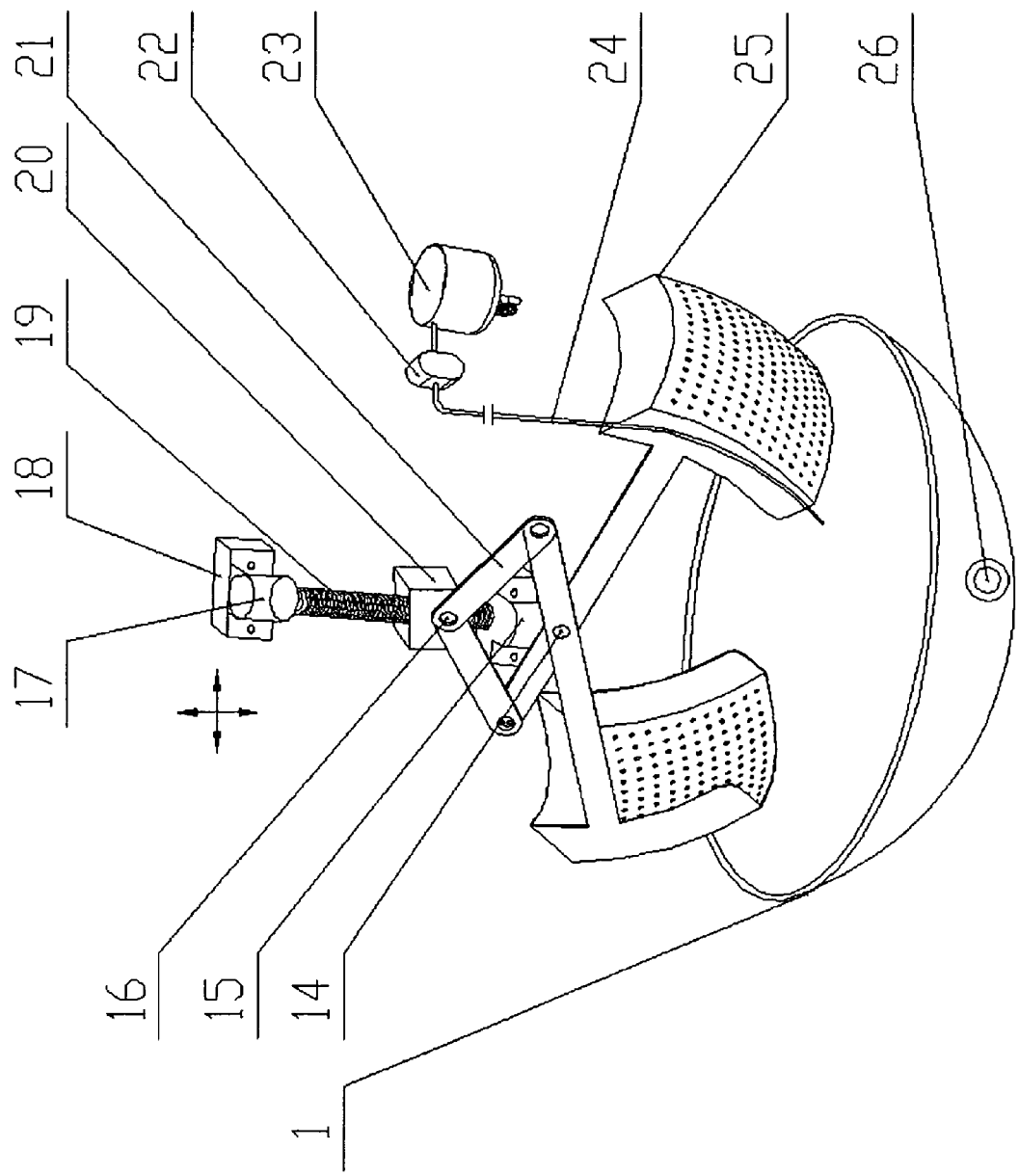
FIG. 3 is a schematic view of a removing-leaching-refeeding mechanism for oil-frying which can be used in the cooking method of the present invention.

The device showed in FIG. 3 is the getting out of pot-leaching-material returning device achieving this method. This device is a clamshell that contains double folding arm linkage 21 and shovel-like tool 25 with leaching hole, the entire mechanism are fixed on the carrier of main machine or moving device depending on up and down positioning bracket 15 and 18, the electrical machine 17 drives the rotating of screw 19 and makes slider 20 move up and down, the double folding arm linkage 21 are connected with lower positioning bracket 15 and slider 20 through the pin 14 and 16 respectively, the double folding arm linkage 21 are activated while the slider 20 is moving up and down, and the two shovel-like tools are folded and opened. When the materials after oil-frying need to be taken out of pot, the entire device are moved to the position above the pot 1 and dropped to the suitable position under the control of control system, the electrical machine 17 drives the rotating of screw 19 and activates slider 20 up and down, the two shovels are folded for obtaining the materials in the pot, and then the entire device is lifted for taking materials out of pot and leaching, the scavenging pump 22 absorbs the oil in the pot back to oil tank 23 through scavenging tube 24, the entire device can be moved out of pot at this time in order to make room for other operations, when the materials returning is needed, the entire device will be moved downwards to a suitable position above the pot 1 under the control of control system, the electrical machine 17 will reverse in order to open two shovels, the materials in the shovels shall return to pot. The 26 is the temperature sensor installed on the inner wall of pot 1, inspecting the temperature of inner wall and the heat transfer medium in the pot, such as temperature of oil and giving a feedback to control system. The senor can be installed on other positions in the cooking system with this method, such as the sensor of environment's temperature installed on carrier, sensor of material's temperature installed on the feeding mouth, the sensor of heat value installed on the heating device, the sensor of gas flow/pressure installed on the tube of gas, and sensor of material's temperature installed on the dispersing tool/stirring tool and in the limit cover etc.

Figure 4:
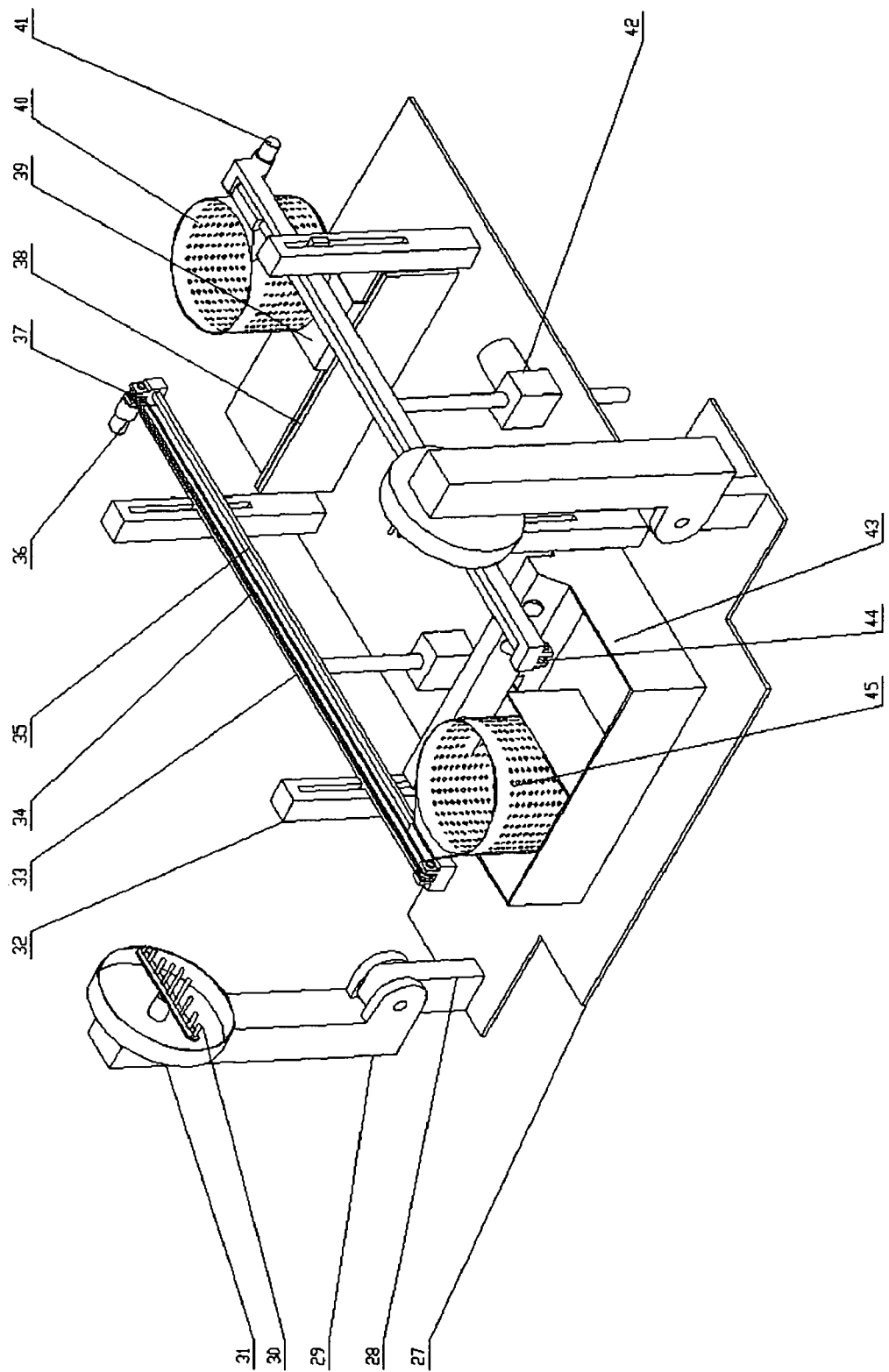
FIG. 4 is a schematic view of an oil-frying sub-system in the cooking device of the present invention.

The device showed in FIG. 4 is a double pot oil-frying sub-system in the cooking system with this method, which contains oil-frying machine, getting out of pot and oil leaching mechanism and cooking material/container transmitting device. The materials are added in the basket-like container 40, 45, and heated in oil pot 43, the overturning arm 29 installed on the base 28 overturns downwards in order to make limit cover 31 cover the container 40, the dispersing tool 30 revolves for dispersing the materials in container 40, 45. When dispersing is finished, the lifting electrical machine 42 lifts the beam 33 along the sliding lane 32 for the lifting of container 40, 45, the materials in the container are separated from oil, the electrical machine 36, 41 drive the rotating of rotating wheel 37 for the moving of strap 34 in order to drive the horizontal moving of container 40, 45 along sliding lane, 44 is the passive rotating wheel on another side of strap, when the container 40, 45 are moved to the position above the groove-like board 38, the lifting electrical machine 42 moves beam 33 downwards to the vertical part of "L" active baseboard 39 of container 40, 45 along sliding lane 32, and it is inserted into the groove of board 38, the electrical machine 36, 41 achieve the continuous horizontal moving of container 40, 45 along sliding lane 35, the active baseboard 39 is whisked away, the materials in container 40, 45 fall into the cooking container under it, reserving container or transmitting/re-feeding device.

Figure 5:
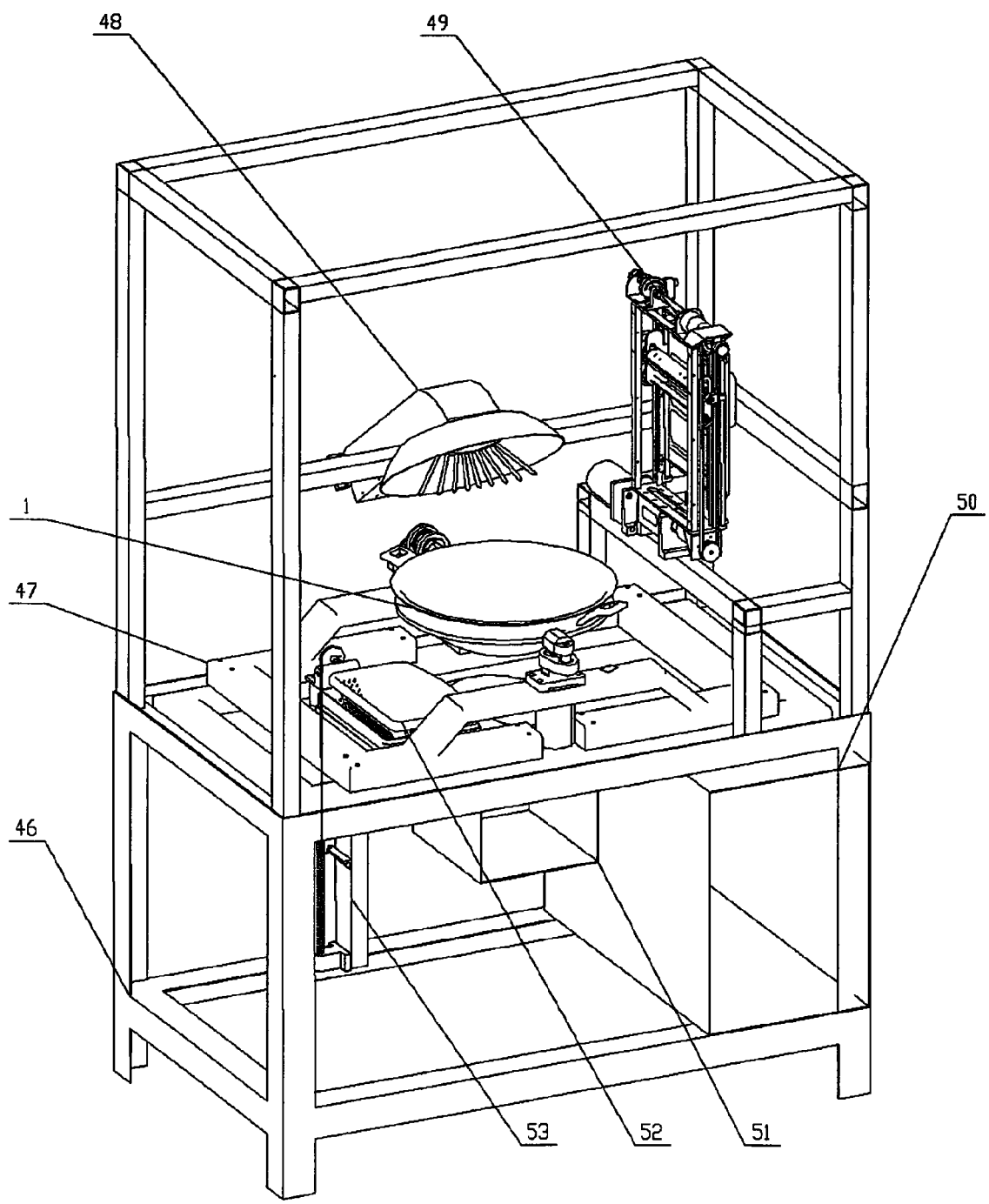
FIG. 5 is a schematic view of a cooking device for oil stir-fry of the present invention.

The device showed in FIG. 5 is a oil stir-fry device with this method, which contains carrier 46, pot 1, motion mechanism of pot 47, dispersing mechanism 48, material-feeding mechanism 49, main control system 50, fire control system 51, leaching groove 52, leaching and material returning device. The motion mechanism of pot 47 will be stated in detail in FIG. 12, which can achieve pot shaking, pot stirring, pot overturning, pot jolting etc.

Figure 6:
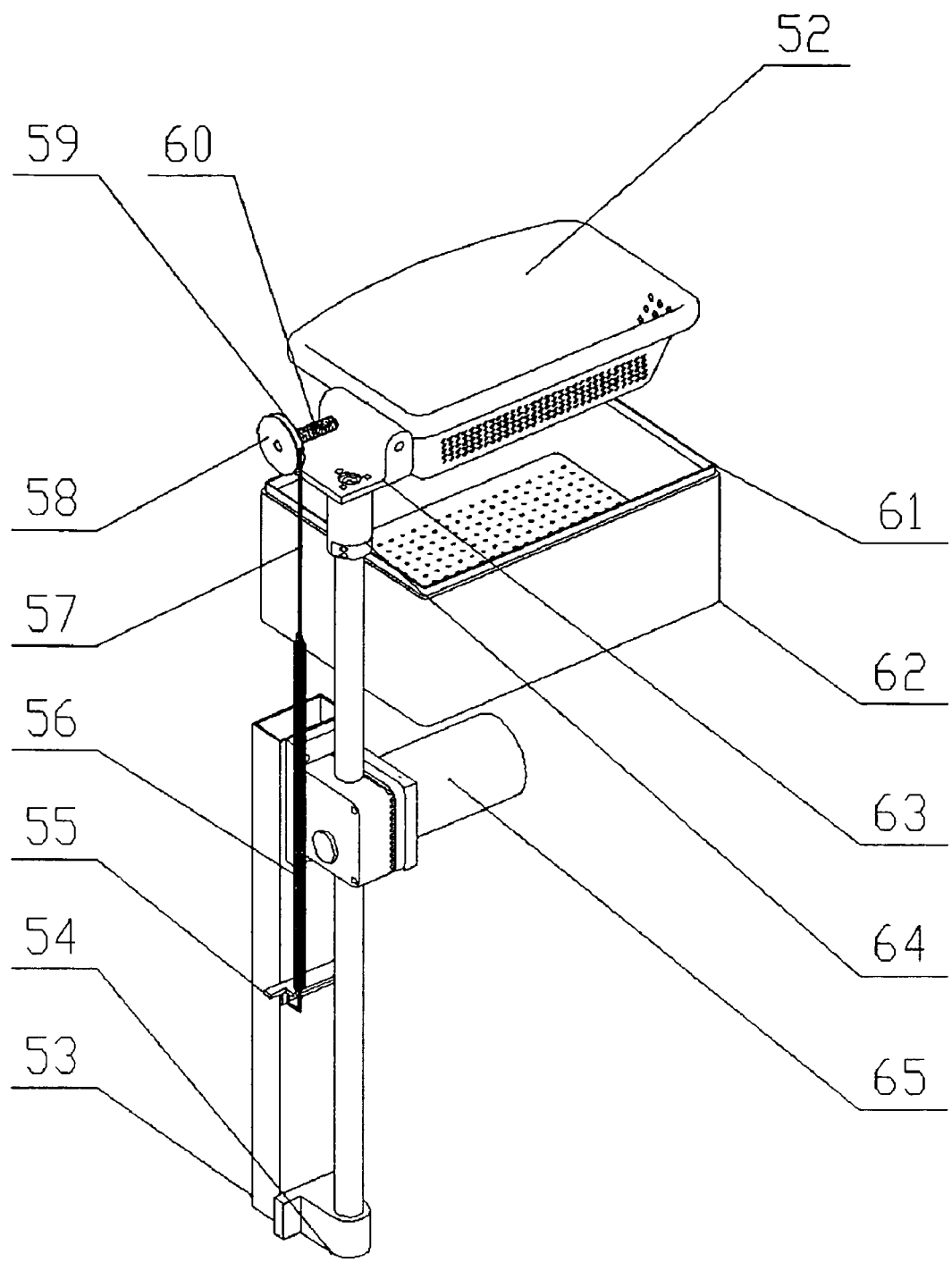
FIG. 6 is a schematic view of the leaching and re-feeding mechanism in the cooking device for oil stir-fry as depicted in FIG. 5.

The device in FIG. 6 are the leaching and material returning devices showed in FIG. 5, after the oil-frying materials are completely dispersed in pot 1, the motion mechanism of pot 47 drives the overturning of pot 1, pours the oil-frying materials and oil altogether into leaching groove 52, the oil funnels through the hole on the leaching groove 52 and out onto the fine filter 61, and flows in the oil tank 62 after fine filtering; When the material returning is necessary, the electrical machine 65 lifts the leaching groove 52, the leaching groove 52 keeps horizontal at this time with the support of torsion spring 60, and the leaching groove 52 keeps rising, the pull of pull spring 56 increases with the rising of leaching groove 52. When the leaching groove 52 is lifted to the position above the pot by electrical machine 65, the motion mechanism of pot 47 rotates pot 1 and slopes it at a certain angle for receiving materials, when the pull of pull spring 56 and limit steel wire 57 is more than the torsional stress of torsion spring 60, the rotating wheel 58 rotates, which drives the overturning of axis 59 and leaching groove 52 on the axis, and the materials in it returns to pot 1, when the certain angle of overturning is exceeded, the entire materials are added in the pot 1, and the electrical machine will stop working; The resetting is opposite to said process, the electrical machine 65 reverses for declining the leaching groove 52, when the torsional stress of torsion spring 60 is more than pull of pull spring 56, the leaching groove 52 returns to horizontal position again. The 53 in figure is bracket, 55 is fixing board of pull spring 56, 54 is limit switch, 63 is installing bracket, 64 is fixing sleeve.

Figure 7:
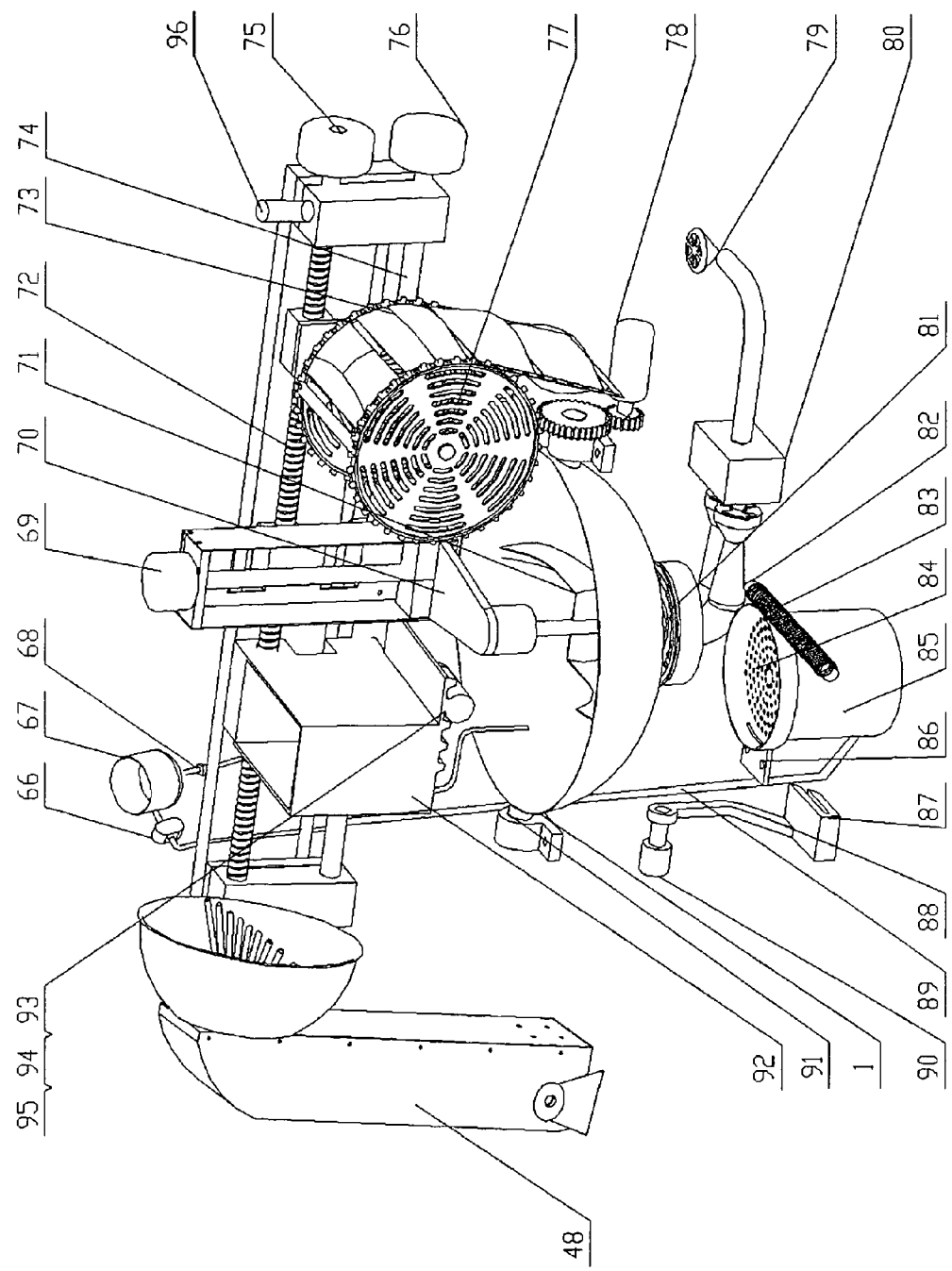
FIG. 7 is a schematic view of an automatic cooking machine which can be used to execute the cooking method of the present invention.

The device in FIG. 7 is an automatic cooking device with this method, which contains pot 1, heating system, material-feeding system, stirring system, control system, inspecting system and oil-frying system. This heating system consists of furnace top 81, automatic adjustment mechanism of gas flow 80 and switch solenoid valve 79. This material-feeding system consists of three parts, the first part is connective bag pre-packaging material-feeding mechanism 77, the materials are packaged in the connective bag 73, the electrical machine 75 achieves the horizontal moving of material-feeding mechanism 77 to the position above pot 1 through screw 72 while adding, the material-feeding mechanism 77 rotates and cuts the package 73 for adding the materials in the pot, then the material-feeding mechanism 77 is removed away from pot 1 in order to make room for operations of other systems; The second part is container material-feeding mechanism 92, the baseboard 93 of container material-feeding mechanism 92 is activated by electrical machine 94 through gear rack mechanism 95, the base of container is opened for adding; The third part is liquid adding mechanism, 67 is oil tank, the amount of oil added is controlled by solenoid valve 68. This stirring system consists of horizontal moving electrical machine 76, screw 74, lifting machine 69, stirring tool driving and transmitting device 70 and stirring tool 71. This inspecting system contains many sensors, such as sensor of environment's temperature 96 etc. The materials are dispersed by dispersing mechanism 48. The electrical machine 78 drives the overturning of pot 1 about axis 91, pours the materials in it onto leaching net 84 for leaching, after the oil flowing to oil jar 85 and being deposited, the oil pump 66 takes oil back to oil tank for repeated using, in material returning device, there is not connector 86 on the leaching net 84, the connector 87 is installed on the reversing arm 88 in conjunction with connector 86, the electrical machine 82 activates the leaching net 84 through screw 83, consequently the connector 86 is inserted into the groove of connector 87, the electrical 90 drives the reversing arm 88 for activating leaching net 84 and overturning it to the position above pot 1, then the material returning is implemented.

Figure 8:
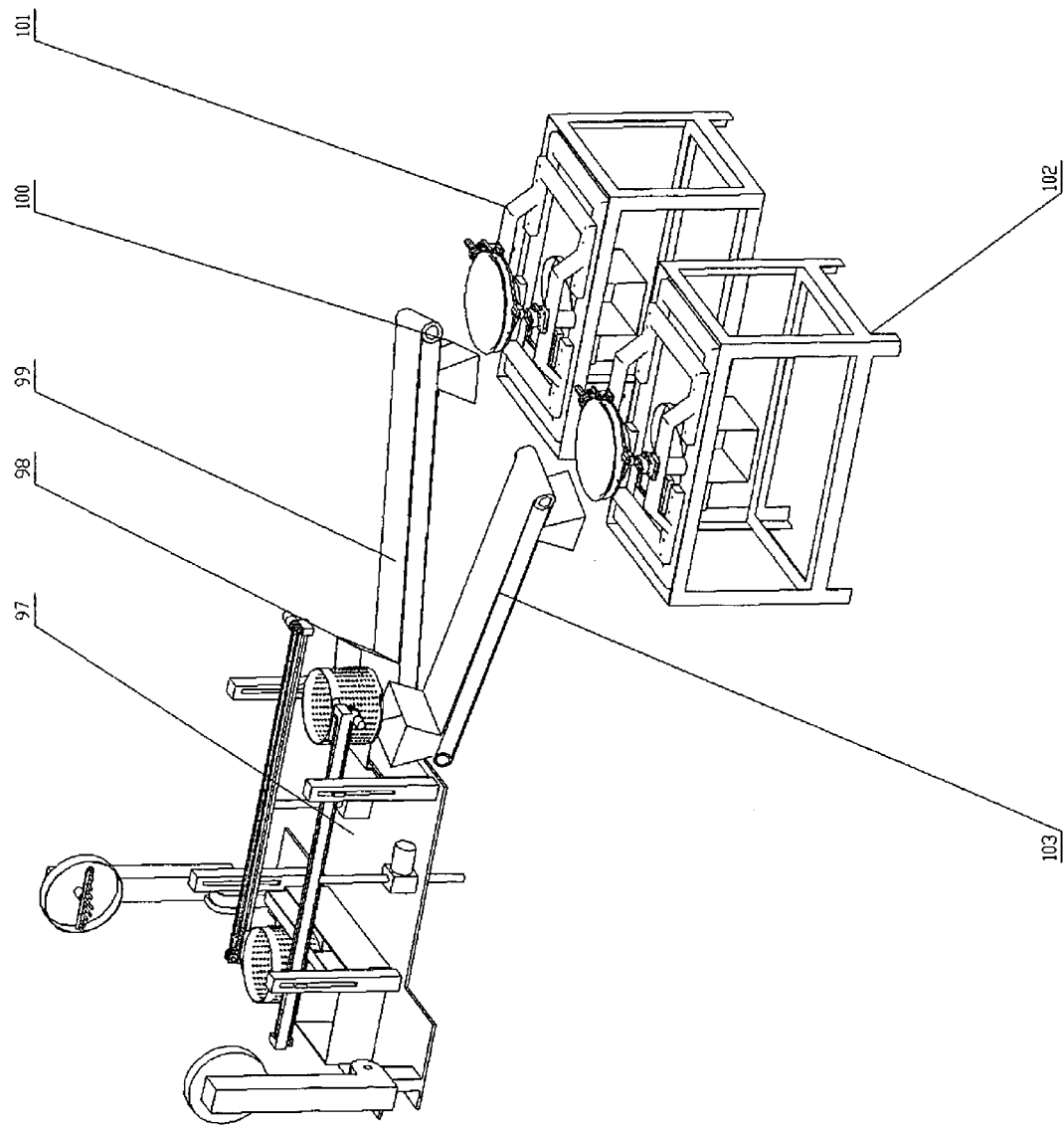
FIG. 8 is a schematic partial view of a cooking system which can be used to execute the cooking method of the present invention.

The device in FIG. 8 is a part of a cooking device system with this method, which contains oil-frying sub-system and stir-fry sub-system. The 97 in figure is the double pot oil-frying sub-system in FIG. 4, 101, 102 is double-post stir-fry sub-system, the materials undertaken oil-frying in oil-frying sub-system fall into the container on the material receiving position 98, then it is moved to position of material-feeding 100 by conveyor belt 99, 103, the container is overturned, and the materials are added in the pot of stir-fry sub-system 101, 102.

Figure 9:
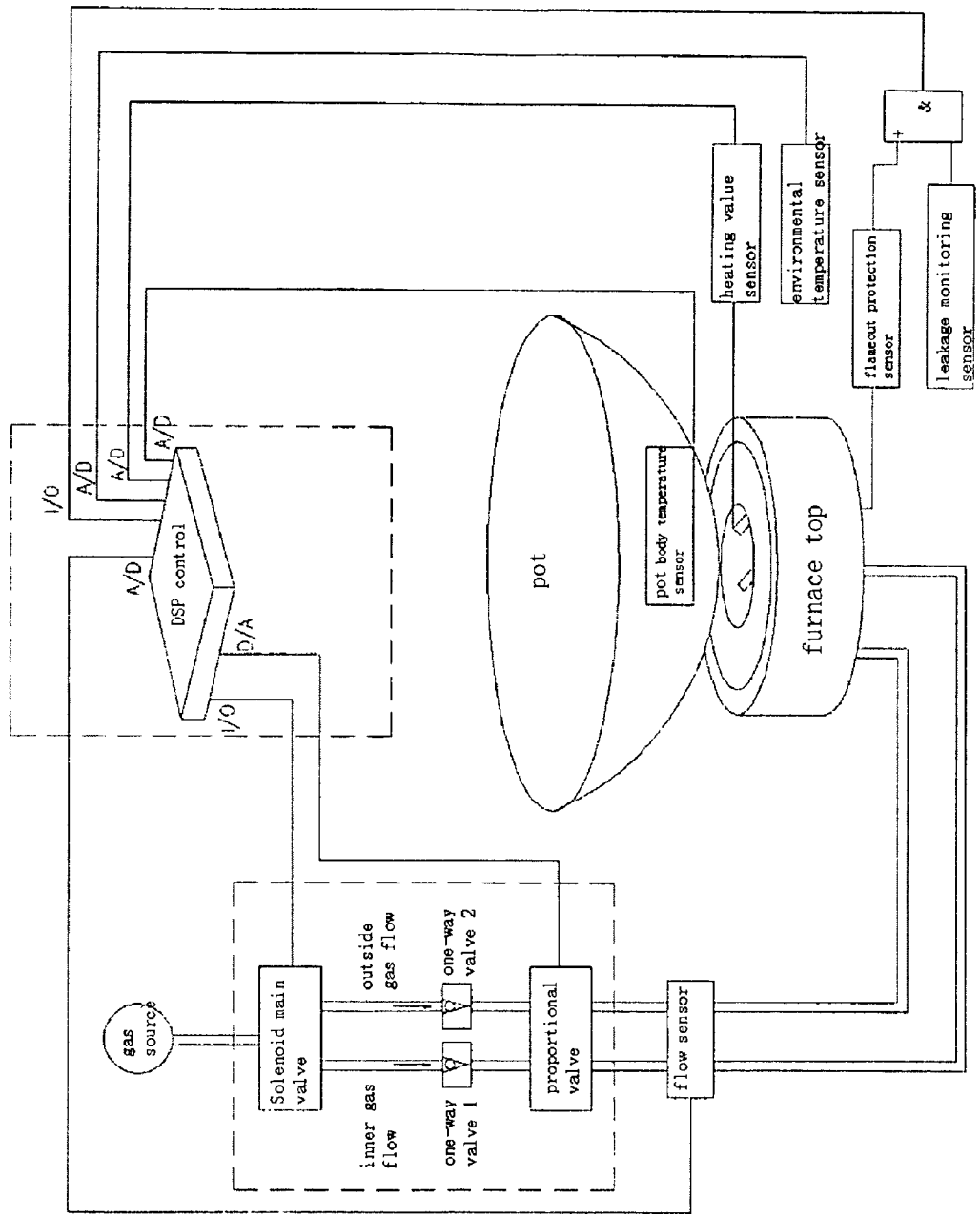
FIG. 9 is a schematic view of a heating intensity control system which can be used in the cooking method of the present invention.

The mechanism in FIG. 9 is a control system of heating intensity, which contains pot, furnace top, system of gas tube and valve, sensor system and control system. The gas are divided into two ways after passing general solenoid valve, and they pass their own one-way valve respectively, and pass the proportion valve adjusting the flow of gas, then one way leads to inside circle of furnace top, providing gas for fire of inside circle, another way leads to outside circle of furnace top, providing gas for fire of outside circle; The DSP control circuit controls the degree of opening of proportion valve according to control program, instruction and/or data from sensor system (sensor of pot's temperature, sensor of heat source's heat value, sensor of environment's temperature etc), controls heating intensity through adjusting flow of gas, and the sensor of flow provides the feedback of flow of gas for DSP control circuit for more accurate control on heating intensity; The DSP control circuit protects protecting system of information measured from sensors and sensor of gas leaking through flameout, for instance, make a timely general solenoid valve, one-way valve, and proportion valve etc closing when flameout or gas leaking happens.

Figure 10:
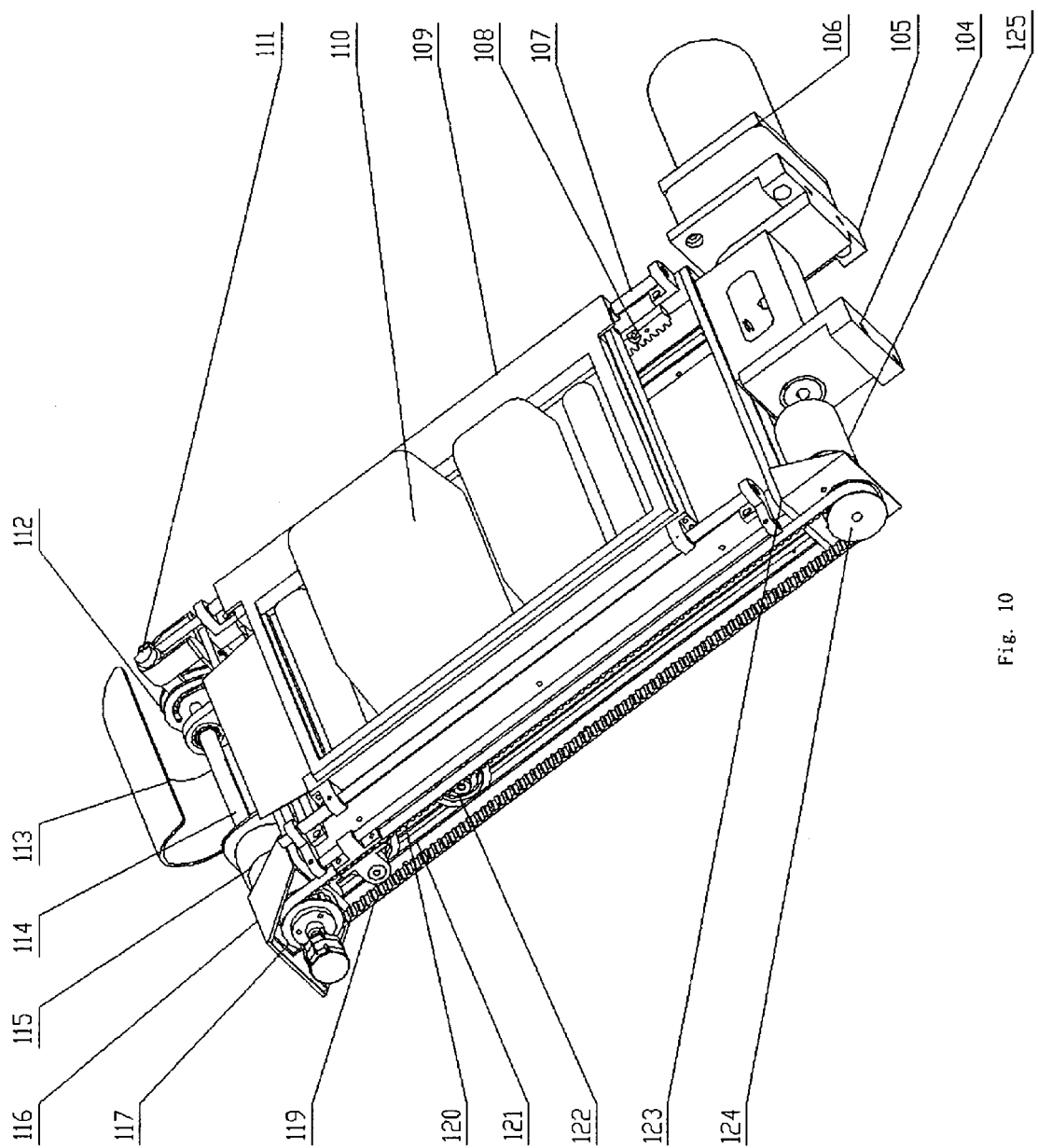
FIGS. 10 and 11 are schematic view of a material-feeding mechanism which can be used in the cooking method of the present invention.
Figure 11:
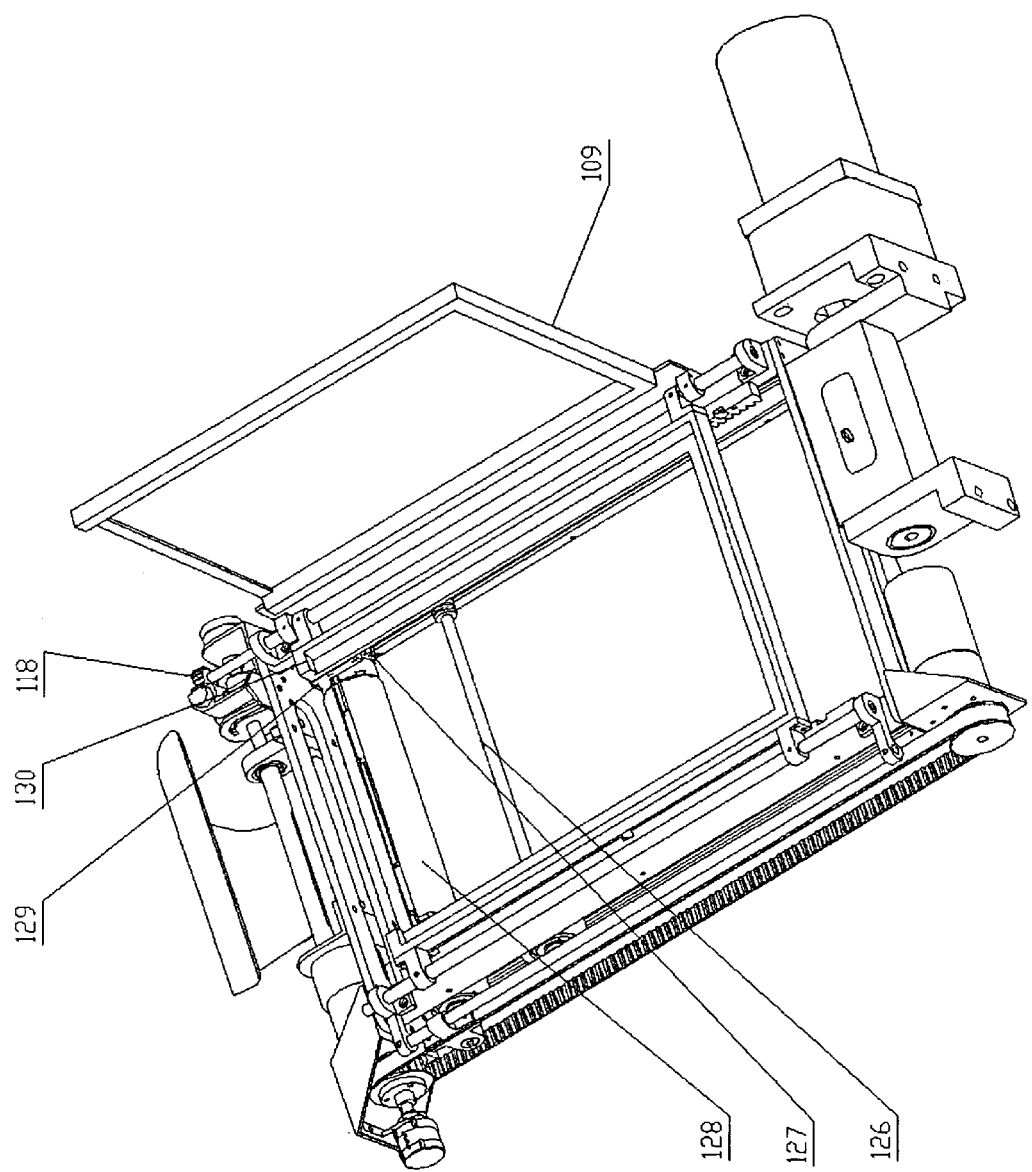

The device in FIGS. 10 and 11 is a box material-feeding mechanism with the method of the present invention. After the materials are added in the every container of material box 110 in order, package them through hot film pressing, the process of material-feeding includes fastening front part of material box seal film through spool, driving the rotating and horizontal moving of spool with synchronous belt, and then ripping the seal film in phases and moments. After the material box 110 is placed on the bracket of material box 130, the electrical machine 115 achieves the 90 degrees rotating of axis 114 and cam 112 installed on it, the cam 112 makes rack axis 111 move upwards for driving the rotating of gear 118 and axis of material box press-board 107, which makes material box press-board 109 rotate 90 degrees in order to hold the edge of material box 110 for its fixing. The axis of film roll 128 consists of two half axes with inner tooth surface which are connected together by hinge, the interior torsion spring fastens them. The main transmitting electrical machine installed on the bracket 123 drives the rotating of axis of film roll 128 through driving pulley 124, driven pulley 117 installed on the bracket 116 and synchronous belt 119, the baffle plate 129 holds the bulge on a half axis of axis of film roll 128, and expands certain degree of opening for two half axes, the electrical machine 115 drives the further 90 degrees rotating of axis 114 at this time, which makes the film pressing board 113 installed on the axis 114 press the front part of seal film reached out by material box into patulous two half axes, and then the electrical machine 115 reverses 90 degrees, the film pressing board 113 is lifted, the electrical machine 125 drives the reversing of axis of film roll 128, leaving the baffle plate 129, the torsion spring folds the two half axes and fastens the film. The gears 127 on two sides of axis of film roll 128 are joggled with the rack 108, 120 on framework, which makes axis of film roll 128 rotate with horizontal moving along track 121 when main transmitting electrical machine 125 driving synchronous belt, consequently the film ripping is achieved. The entire material-feeding mechanism is connected with bracket of cooking system through the installation of support board 104, 105, the electrical machine 106 can achieve the position's changing of material-feeding mechanism between the position of horizontal adding and the position of vertical waiting.

Figure 12:
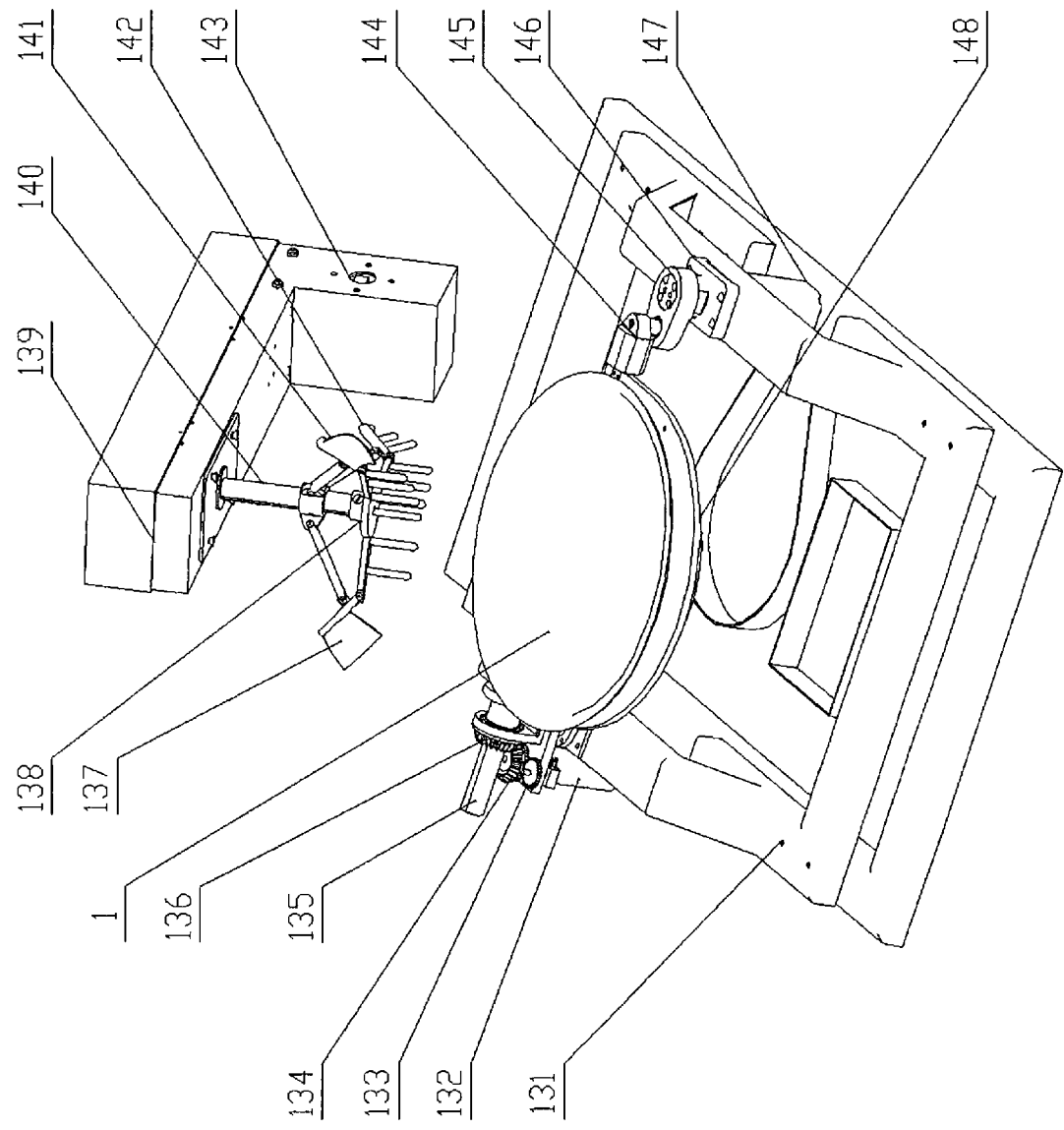
FIG. 12 is a schematic view of a stir-frying mechanism which can be used in the cooking method of the present invention.

The device in FIG. 12 is a stir-frying mechanism with this method, which contains pot motion device and stirring device, the pot motion device and stirring device can be used alone and also together. The pot 1 is connected with pot motion device through pot fixing ring 148, the pot motion device is installed on the platform of pot motion 131, the stirring device is connected with carrier of main machine through rotating arm 143. The overturning electrical machine 132 can achieve pot stirring, overturning, and jolting etc by means of rotating at variable speed around horizontal axis of pot 1 driven by column straight gear 133 and cone gear 134, 136. The electrical machine 147 is installed on the platform of pot motion 131 through bracket 146, and can achieve pot shaking etc by means of horizontal moving at variable speed of pot 1 driven by brace 145, axis connecting board 144 and sliding pole 135. The stirring shovel 137, gathering shovel 141 and tooth-like tool 142 installed on the stirring tool 138 can achieve scooping up-overturning, scooping up-gathering and dispersing etc respectively. The turning-over mechanism 139 installed in the swing arm drives the rotating of stirring tool 138 through axis 140.

What is claimed is:

1. An intelligent stir-frying method performed in a cooking device which contains one or more cooking containers, a control system and a heating system including the following steps:
    (1) starting the cooking device;
    (2) feeding heat transfer medium into one of the cooking containers and heating the heat transfer medium by the heating system of the cooking device according to the instruction from the control system of the cooking device;
    (3) feeding cooking material into the heat transfer medium in the cooking container according to the instruction from the control system, wherein the cooking material is directly contacted with the surface of the cooking container;
    (4) dispersing the cooking material in the cooking container with a comb-like dispersing mechanism;
    (5) removing the cooking material from the cooking container and separating the cooking material from the heat transfer medium;
    (6) re-feeding the cooking material which is separated from the heat transfer medium into one of the cooking containers;
    (7) stir-frying and/or turning-over the cooking material in the cooking container of step (6),
    wherein the heat transfer medium is cooking oil or fat,
    wherein said cooking device further comprises a separating mechanism, said separating of said cooking material from said heat transfer medium is implemented through said separating mechanism, and
    wherein said cooking device further includes a dispersing/turning-over mechanism, said dispersing in step (4) and said stir-frying and/or turning-over in step (7) are implemented through said dispersing/turning-over mechanism.

2. The stir-frying method according to claim 1, wherein said stir-frying method further includes the step of inputting data, inputting instruction, and/or loading a software after starting the cooking device.

3. The stir-frying method according to claim 2, wherein said loading of a software is done by utilizing the information on a cooking material package.

4. The stir-frying method according to claim 1, wherein said cooking device further includes one or more material-feeding mechanism,
    said cooking material is placed in a cooking material package, said package is opened by said material-feeding mechanism and said cooking material is added into said cooking container; and/or said cooking material is placed in a container, and said cooking material in said container is added into said cooking container through said material-feeding mechanism.

5. The stir-frying method according to claim 1, wherein said cooking device further includes a liquid adding mechanism, and said heat transfer medium is added through said liquid adding mechanism.

6. The stir-frying method according to claim 1, wherein the heating intensity of said heating system is controlled automatically or semi-automatically by said control system.

7. The stir-frying method according to claim 1, wherein said cooking material added into said heat transfer medium in step (3) is main material, and one or more kinds of other material is added in one time or in several times before or after feeding said main material in step (6).

8. The stir-frying method according to claim 7, wherein said main material is meat material, and said meat material is covered with starch material.

9. The stir-frying method according to claim 7, wherein said stir-frying method further includes a step of adding seasonings and/or starch material when re-feeding said material returning in step (6).

\* \* \* \* \*